Patented July 18, 1939

2,166,806

UNITED STATES PATENT OFFICE

2,166,806

PEANUT PRODUCT AND METHOD

Robert Newell Du Puis, Charles William Lenth, and John B. Segur, Chicago, Ill., assignors to Association of American Soap & Glycerine Producers, Inc., New York, N. Y., a corporation of Delaware No Drawing. Application October 20, 1938, Serial No. 235,994

8 Claims. (Cl. 99—128)

This invention resides in a novel peanut product and in a novel method of compounding the same in which a composition is produced containing finely subdivided peanuts the oil content of which is stabilized with respect to separation by the addition of free glycerine.

Heretofore, in peanut butter and other ground peanut compositions, reliable prevention of segregation of the oil constituent has not been possible. When such segregation occurs in a product such as peanut butter the upper portions of the container containing the product become filled with an excess of peanut oil and the lower portions of the container contain a product so lacking in oil that it is so dry as to be unsatisfactory for the purpose. Attempts have been made to minimize this difficulty by careful transportation and storage of peanut products such as peanut butter, but it is not always convenient to protect such products against long standing or excessive temperature. At times a peanut product without any accountable reason will exhibit a tendency to segregate even on very brief standing and without exposure to excessive temperature. In an effort to prevent such deterioration, the manufacturers of peanut butter and like products have in some cases resorted to limiting the fineness of milling or grinding in order to produce a product which is stiffer and less subject to segregation. In such cases the desirable smoothness of product is sacrificed and palatableness is treated as a secondary consideration.

Through this invention, however, a ground or milled peanut butter can be prepared without appreciable segregation of oil during manufacture even when finely ground and a product produced which, upon standing or even upon exposure to high storage temperatures, is free of undesirable segregation of the oil constituent.

In one instance of the process of this invention the desired varieties of peanuts are selected, shelled, roasted, peeled, and the kernels removed. The selected varieties of peanuts are then blended and fed to the usual peanut mill or grinder. During the passage of the peanuts to the mill they are coated with a small quantity of glycerine, by spraying, dipping, tumbling, or by other suitable method. The amount of glycerine employed need be regulated only with respect to the stability of the product desired, since any amount upward of one-tenth of one per cent and as high as twenty per cent may be added with beneficial effect. If desired, the peanuts may be ground in the usual way without the addition of glycerine and the glycerine may be later added in the above proportion by thorough mixing with the finished peanut product. In either case a ground peanut product results which is free to whatever extent desired of the normal tendency of oil to segregate from peanut butter.

This effect of the glycerine on the oil retention of the peanut solid is an unexpected and new property of glycerine, as it is well known that glycerine and oil are immiscible and yet a mixture of peanut solid, peanut oil and glycerine has properties—depending in degree upon the amount of glycerine added—which are entirely different from the properties of ground peanut products without glycerine.

If desired, through this invention the grinding of the nuts to a smaller particle size can be accomplished without the segregation of oil which would otherwise normally result. This produces a smoother, finer, more palatable product with results not obtainable by methods heretofore in use. It will be further observed that the product of this invention has a further advantage independent of the degree of fineness of grinding in that the product of this invention is reduced in its tendency to stick to the walls of the mouth.

The proportion of glycerine to peanuts selected will depend to a large degree upon the dryness or oiliness of the product desired. For a peanut butter of normal consistency, a concentration of one to five per cent of glycerine is suitable, and our preferred product is prepared with a content of two per cent glycerine, based upon the weight of the peanut butter. For some purposes, when a dryer product, that is, one showing less tendency toward segregation of the oil, is desired, more glycerine may be added. On the other hand, if it is desired to increase the amount of liberated oil, it is only necessary to reduce the concentration of glycerine. The advantages of this invention may be obtained to substantial degree over a concentration range of from one-tenth of one per cent to twenty per cent of added free glycerine. In some instances it may be desirable to increase the oil content over that normally contained by peanuts by addition of peanut or similar oil. In such cases the addition of glycerine makes possible a staple product in spite of the additional oil.

While there has been described herein a specific instance of the application of this invention, it is desired that it be understood that the same is set forth by way of illustration and not of limitation and that the protection of Letters Patent to be granted hereon extend to the full limits of the advance represented herein as set forth in the claims appended hereto.

What we claim as our invention and desire to secure by Letters Patent is:

1. A composition of matter comprising finely subdivided peanuts and added free glycerine.

2. A composition of matter comprising finely subdivided peanuts, peanut oil, and added free glycerine.

3. A composition of matter comprising finely subdivided peanuts and one-tenth to twenty per cent of added free glycerine.

4. A composition of matter comprising finely subdivided peanuts containing substantially one per cent to five per cent of added free glycerine.

5. A composition of matter containing finely subdivided peanuts and approximately two per cent of added free glycerine.

6. A composition of matter comprising finely subdivided peanuts, added oil, and added free glycerine.

7. A method of preparing a ground peanut product which comprises grinding peanuts in the presence of added free glycerine.

8. The method of preparing peanut butter which comprises shelling, roasting, cleaning said peanuts, then coating the same with free glycerine, and then feeding said coated peanuts into a mill and grinding the same to the consistency of peanut butter.

ROBERT NEWELL DU PUIS.
CHARLES WILLIAM LENTH.
JOHN B. SEGUR.

CERTIFICATE OF CORRECTION.

Patent No. 2,166,806.  July 18, 1939.

ROBERT NEWELL DU PUIS, ET AL.

It is hereby certified that error appears in the printed specification of the above numbered patent requiring correction as follows: Page 1, second column, line 47, for "staple" read stable; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.

the advance represented herein as set forth in the claims appended hereto.

What we claim as our invention and desire to secure by Letters Patent is:

1. A composition of matter comprising finely subdivided peanuts and added free glycerine.
2. A composition of matter comprising finely subdivided peanuts, peanut oil, and added free glycerine.
3. A composition of matter comprising finely subdivided peanuts and one-tenth to twenty per cent of added free glycerine.
4. A composition of matter comprising finely subdivided peanuts containing substantially one per cent to five per cent of added free glycerine.
5. A composition of matter containing finely subdivided peanuts and approximately two per cent of added free glycerine.
6. A composition of matter comprising finely subdivided peanuts, added oil, and added free glycerine.
7. A method of preparing a ground peanut product which comprises grinding peanuts in the presence of added free glycerine.
8. The method of preparing peanut butter which comprises shelling, roasting, cleaning said peanuts, then coating the same with free glycerine, and then feeding said coated peanuts into a mill and grinding the same to the consistency of peanut butter.

ROBERT NEWELL DU PUIS.
CHARLES WILLIAM LENTH.
JOHN B. SEGUR.

CERTIFICATE OF CORRECTION.

Patent No. 2,166,806.     July 18, 1939.

ROBERT NEWELL DU PUIS, ET AL.

It is hereby certified that error appears in the printed specification of the above numbered patent requiring correction as follows: Page 1, second column, line 47, for "staple" read stable; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.